United States Patent
Tian et al.

(10) Patent No.: US 9,429,747 B2
(45) Date of Patent: Aug. 30, 2016

(54) ELECTROWETTING DISPLAY PANEL WITH OPAQUE INSULATING LAYER

(71) Applicant: BOE TECHNOLOGY GROUP CO., LTD., Beijing (CN)

(72) Inventors: Xiaoxiong Tian, Beijing (CN); Jianshe Xue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 13/643,515

(22) PCT Filed: Sep. 29, 2012

(86) PCT No.: PCT/CN2012/082445
§ 371 (c)(1),
(2) Date: Oct. 25, 2012

(87) PCT Pub. No.: WO2013/053299
PCT Pub. Date: Apr. 18, 2013

(65) Prior Publication Data
US 2014/0055839 A1    Feb. 27, 2014

(30) Foreign Application Priority Data
Oct. 10, 2011   (CN) .......................... 2011 1 0304731

(51) Int. Cl.
*G02B 26/00*    (2006.01)
(52) U.S. Cl.
CPC .................... *G02B 26/005* (2013.01)
(58) Field of Classification Search
CPC .................................................. G02B 26/005
USPC ............... 359/237–240, 245–246, 250–252, 359/346–384, 290–298, 242, 265–271; 429/209, 246
See application file for complete search history.

(56) References Cited

U.S. PATENT DOCUMENTS 7,522,332 B2 *   4/2009   Liang et al. .................. 359/296
2005/0151709 A1   7/2005   Jacobson et al.
(Continued)

FOREIGN PATENT DOCUMENTS

CN    101355838 A    1/2009
CN    101359091 A    2/2009
(Continued)

OTHER PUBLICATIONS

International Search Report mailed Mar. 1, 2013; PCT/CN2012/082445.
(Continued)

*Primary Examiner* — Bumsuk Won
*Assistant Examiner* — Tamara Y Washington
(74) *Attorney, Agent, or Firm* — Ladas & Parry LLP

(57) ABSTRACT

An embodiment of the present invention provides an electrowetting display panel which can achieve full-color display, comprising: a first substrate; a second substrate opposite to the first substrate; a plurality of baffle walls disposed on the second substrate and defining a plurality of sub-pixels; an opaque insulating layer disposed on the second substrate, the opaque insulating layer comprising a dielectric layer and opaque liquid elements disposed on the dielectric layer, the opaque insulating layer being capable of displaying black or white under an action of an electric field; a plurality of colored liquid elements corresponding to the individual sub-pixels respectively and disposed between the opaque insulating layer and the first substrate, the colored liquid elements being an electric-conductive or polar light-transmissive color solution.

13 Claims, 2 Drawing Sheets

(56) References Cited

U.S. PATENT DOCUMENTS

| | | | |
|---|---|---|---|
| 2009/0027751 A1 | 1/2009 | Chen et al. | |
| 2009/0059348 A1* | 3/2009 | Niwano et al. | 359/296 |
| 2010/0033798 A1 | 2/2010 | Wang et al. | |
| 2010/0128341 A1 | 5/2010 | Cheng et al. | |
| 2010/0207867 A1* | 8/2010 | Wang et al. | G09G 3/344 345/107 |
| 2013/0241815 A1 | 9/2013 | Ishida et al. | |
| 2014/0313177 A1 | 10/2014 | Van Dijk et al. | |

FOREIGN PATENT DOCUMENTS

| | | |
|---|---|---|
| CN | 101930118 A | 12/2010 |
| JP | 2004-294557 A | 10/2004 |
| JP | 2006-178196 A | 7/2006 |
| JP | 2010-532011 A | 9/2010 |
| KR | 20070099706 A | 10/2007 |
| KR | 20080071250 A | 8/2008 |
| KR | 20080071254 A | 8/2008 |
| WO | 2011/111710 A1 | 9/2011 |

OTHER PUBLICATIONS

International Preliminary Report on Patentability dated Apr. 15, 2014; PCT/CN2012/082445.
First Chinese Office Action dated Sep. 2, 2013; Appln. No. 201110304731.1.
Korean Office Action dated Oct. 21, 2013: Appln. No. 10-2012-7030792.
Korean Notice of Allowance dated Feb. 26, 2014; Appln, No. 10-2012-7030792.
First Chinese Office Action Issued Apr. 30, 2014 Appln. No. 201110304731.1.
Extended European Search Report Issued May 22, 2014 Appln. No. PCT/CN2012/082445.
Japanese Office Action; Date of Drafting: Jun. 16, 2016; Appln. No. 2014-533759.

* cited by examiner

ELECTROWETTING DISPLAY PANEL WITH OPAQUE INSULATING LAYER

CROSS REFERENCE TO RELATED APPLICATIONS

This application is a national stage application under 35 U.S.C. 371 and claims the benefit of PCT Application No. PCT/CN2012/082445 having an international filing date of Sep. 29, 2012, which designated the United States, which PCT application claimed the benefit of Chinese Application No. 201110304731.1 filed Oct. 10, 2011, the disclosure of both the above-identified applications are incorporated herein by reference.

TECHNICAL FIELD

An embodiment of the present invention relates to an electrowetting display panel.

BACKGROUND

Electrowetting phenomenon is that a contact angle between an electrolyte solution and an insulating layer changes under an action of an electric field, that is, the electrolyte solution contracts or expands on a surface of the insulating layer under the action of the electric field. An electrowetting display device utilizes the electrowetting phenomenon to display and, by means of electrodes, controls expansion or contraction of oil ink to display. The electrowetting display technology is more and more favored by people because of its features of bistable state display, good reflectivity, low power consumption, wide temperature range and fast enough response speed. The electrowetting display technology at present is still at its preliminary stage, but its demonstrated superior performance and development potential indicate that electrowetting displaying will become an important display method in the field of display technology in future.

FIG. 1A and FIG. 1B show schematic sectional views of an electrowetting display device in the prior art. As shown in FIG. 1, the electrowetting display device in the prior art comprises an electrode 1, a dielectric layer 2 (having a hydrophobic surface), an oil ink layer 3 and a saline solution layer 4, which are disposed between an upper substrate and a lower substrate (both not shown). The electrode 1 is disposed on the lower substrate, the dielectric layer 2 is disposed on the electrode 1, the oil ink layer 3 is disposed on the dielectric layer 2, and the saline solution layer 4 is disposed on the oil ink layer 3. The oil ink layer 3 is colored, and the saline solution layer 4 is transparent.

In one pixel, when no voltage is applied, as shown in FIG. 1A, the oil ink layer 3 is flatted or tiled as a flat thin film on the dielectric layer 2; therefore the pixel is presented as a colored pixel point. When a voltage is applied between the electrode 1 and the oil ink layer 3, as shown in FIG. 1B, the tension of the contact surface of the dielectric layer 2 with the oil ink layer 3 will changes, the result is that the original static state in the pixel becomes no longer stable, and the oil ink layer 3 is moved to one side of the pixel, so that the pixel become a partially transparent pixel point. In the electrowetting display, the oil ink layer 3 may have two functions, including: 1. acting for shielding: in black-and-white display, the oil ink layer 3 is used for shielding and is generally black; 2. acting for displaying: in color display, the color that the oil ink layer 3 by itself is used for display. However, as shown in FIG. 1B, in color display, although the oil ink layer 3 in contraction lets most of the pixel region be exposed, it still shields part of the pixel region, and therefore the display cannot render a satisfying full-color display effect for users.

SUMMARY

One of the problems to be solved by the present invention is to provide an electrowetting display panel, which can achieve color or full-color display.

According to one aspect of the present invention, there is provided an electrowetting display panel, comprising: a first substrate; a second substrate opposite to the first substrate; a plurality of baffle walls disposed on the second substrate and defining a plurality of sub-pixels; an opaque insulating layer disposed on the second substrate, the opaque insulating layer comprising a dielectric layer and opaque liquid elements disposed on the dielectric layer, the opaque insulating layer being capable of displaying black or white under an action of an electric field; a plurality of colored liquid elements corresponding to the individual sub-pixels respectively and disposed between the opaque insulating layer and the first substrate, the colored liquid elements being an electric-conductive or polar light-transmissive color solution.

For example, the electrowetting display panel further comprises: a plurality of pixel electrodes corresponding to the individual sub-pixels respectively and disposed between the second substrate and the opaque insulating layer.

For example, the colors of the colored liquid elements of the plurality of sub-pixels are different from one another.

For example, the plurality of colored liquid elements are a transparent electric-conductive saline solution.

For example, the opaque insulating layer comprises: a white dielectric layer disposed on the second substrate; and black opaque liquid elements corresponding to the individual sub-pixels respectively and disposed on the white dielectric layer, the colored liquid elements and the black opaque liquid elements in the individual sub-pixels being immiscible. For example, the black opaque liquid elements of adjacent sub-pixels are immiscible inter se.

For example, the opaque insulating layer comprises: a black dielectric layer disposed on the second substrate; and white opaque liquid elements corresponding to the individual sub-pixels respectively and disposed on the black dielectric layer, the colored liquid elements and the white opaque liquid elements in the individual sub-pixels being immiscible. For example, the white opaque liquid elements of adjacent sub-pixels are immiscible inter se.

For example, the pixel electrodes are black and opaque; the opaque insulating layer comprises: a transparent dielectric layer disposed on the second substrate; and white opaque liquid elements corresponding to the individual sub-pixels respectively and disposed on the transparent dielectric layer, the colored liquid elements and the white opaque liquid elements in the individual sub-pixels being immiscible.

For example, the pixel electrode are white and opaque, and the opaque insulating layer comprises: a transparent dielectric layer disposed on the second substrate; and black opaque liquid elements corresponding to the individual sub-pixels respectively and disposed on the transparent dielectric layer, the black opaque liquid elements and the colored liquid elements being immiscible.

For example, the black opaque liquid elements or the white opaque liquid elements are hydrocarbon oils.

The electrowetting display panel according to the embodiment of the present invention has a opaque insulating layer disposed on the second substrate thereof, the opaque insulating layer comprises a dielectric layer and a plurality of opaque liquid elements disposed on the dielectric layer, and the dielectric layer and the opaque liquid elements are able to cooperate to implement switching between black and white under an action of an electric field; meanwhile, between the opaque insulating layer and the first substrate, there are disposed colored liquid elements; thus, the individual sub-pixels of the electrowetting display panel can utilize the colored liquid elements to display colors when the opaque insulating layer is presented in white, and display black when the opaque insulating layer is presented in black, thereby achieving color or full-color display.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention are directed to the problem that an electrowetting display device in the prior art cannot satisfactorily achieve full-color display, and to provide an electrowetting display panel which can achieve full-color display.

Figure 1A:
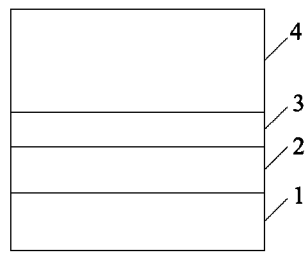
FIG. 1A is a schematic sectional view of an electrowetting display device in the prior art, when no voltage is applied.
Figure 1B:
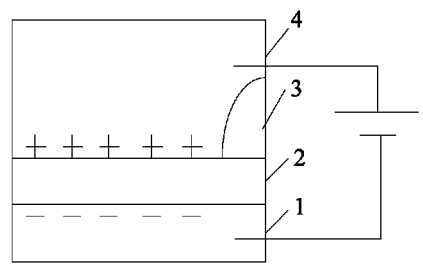
FIG. 1B is a schematic sectional view of an electrowetting display device in the prior art, when a voltage is applied.
Figure 2:
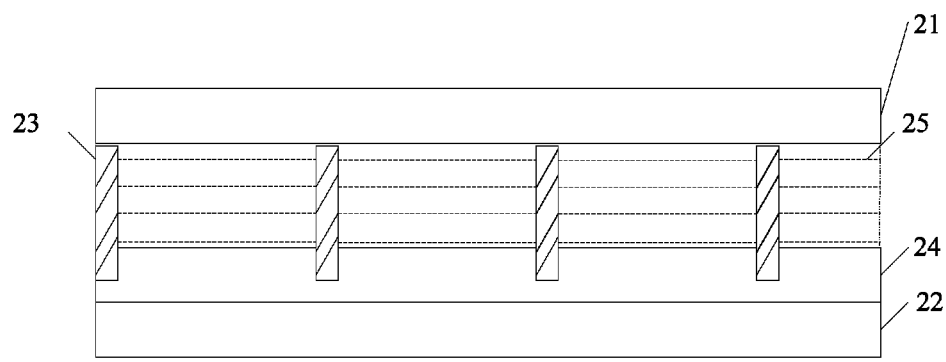
FIG. 2 is a schematic structural view of an electrowetting display panel according to an embodiment of the present invention.

FIG. 2 is a schematic structural view of an electrowetting display panel according to an embodiment of the present invention. The electrowetting display panel comprises a plurality of pixels so as to display. The following description will be focused on a single pixel, but it is clearly applicable to the other pixels.

The electrowetting display panel comprises: a first substrate 21; a second substrate 22 opposite to the first substrate 21, with a gap between the two substrates; a plurality of (more than two) baffle walls 23 disposed on the second substrate 22, the plurality of baffle walls 23 defining a plurality of (for example, more than two) sub-pixels; an opaque insulating layer 24 disposed on the second substrate 22, the opaque insulating layer 24 comprising a dielectric layer and opaque liquid elements disposed on the dielectric layer, which are able to present black or white color under an action of an electric field; and colored liquid elements 25 corresponding to the individual sub-pixels respectively and disposed between the opaque insulating layer 24 and the first substrate 21. The colors of the colored liquid elements 25 of the plurality of sub-pixels may be different from one another, and includes, for example, red, green and blue, in order to achieve full-color display. When the electrowetting display panel implements a monochrome display, the colors of these colored liquid elements 25 may be the same as one another. These colored liquid elements 25 are electric-conductive or possess a polarity or polarities.

The electrowetting display panel further comprises pixel electrodes corresponding to the individual sub-pixels. The pixel electrodes are disposed between the second substrate 22 and the opaque insulating layer 24, corresponding to the individual sub-pixels respectively.

In this embodiment of the invention, the colored liquid elements 25, for example, use a transparent electric-conductive colored saline solution.

In the electrowetting display panel of this embodiment of the invention, on the second substrate 22, there is disposed a opaque insulating layer 24, and the opaque insulating layer 24 comprises a dielectric layer and opaque liquid elements disposed on the dielectric layer, and the dielectric layer and the opaque liquid elements can cooperate to implement switching between black and white colors under an action of an electric field; meanwhile, between the opaque insulating layer and the first substrate, there are disposed colored liquid elements. The individual sub-pixels of the electrowetting display panel can utilize the colored liquid elements to display various colors when the opaque insulating layer is presented in white color, and display black when the opaque insulating layer is presented in black color, thereby achieving full-color display.

Figure 3:
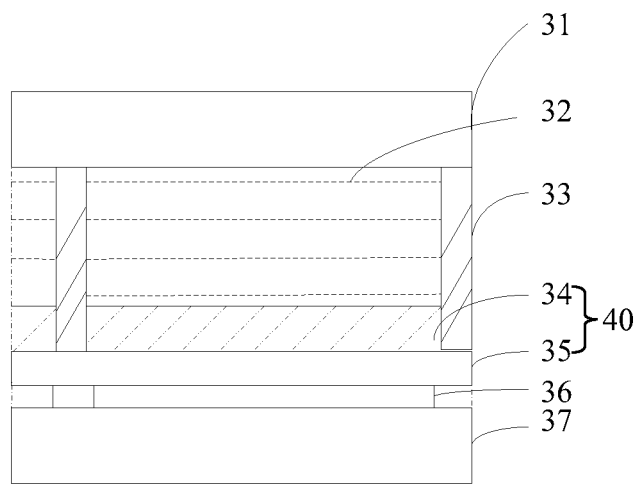
FIG. 3 is a schematic structural view of an electrowetting display panel in an embodiment of the present invention, when no voltage is applied.

Below, in connection with FIG. 3 and FIG. 4, the electrowetting display panel according to an embodiment of the present invention will be further described. FIG. 3 is a schematic structural view of an exemplary electrowetting display panel according to an embodiment of the present invention, when no voltage is applied; and FIG. 4 is a schematic structural view of the exemplary electrowetting display panel according to the embodiment of the present invention, when a voltage is applied.

Figure 4:
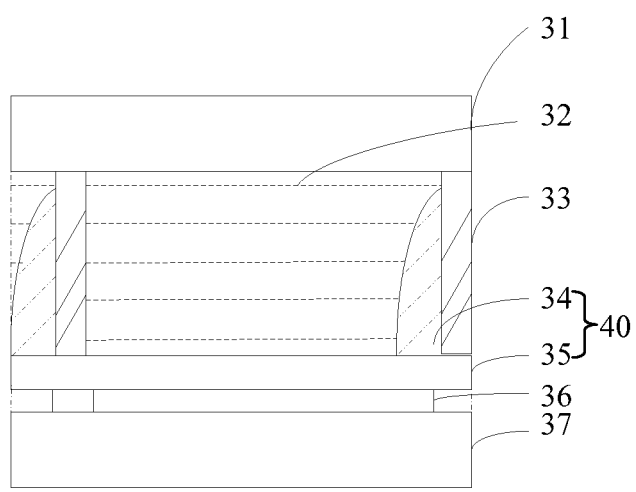
FIG. 4 is a schematic structural view of an electrowetting display panel in an embodiment of the present invention, when a voltage is applied.

As shown in FIG. 3 and FIG. 4, the exemplary electrowetting display panel comprises: a first substrate 31; a second substrate 37 disposed opposite to the first substrate 31; a plurality of (for example, more than two) baffle walls 33 disposed on the second substrate 37, the baffle walls 33 defining a plurality of (more than two) sub-pixels; pixel electrodes 36 disposed on the second substrate 37; an opaque insulating layer 40 disposed on the pixel electrodes 36; and colored liquid elements 32 disposed between the opaque insulating layer 40 and the first substrate 31.

The opaque insulating layer 40 comprises a dielectric layer 35 and opaque liquid elements 34 disposed on the dielectric layer 35. The colored liquid elements 32 are disposed between the opaque liquid elements 34 and the first substrate 31. The dielectric layer 35 is an insulating solid layer; the opaque liquid elements 34 are insulating liquid, and are immiscible with—that is, repelling with—the colored liquid elements 32. Each sub-pixel correspondingly comprises one pixel electrode, one colored liquid element and one opaque liquid element.

The colored liquid elements 32 can conduct electricity or possess a polarity or polarities. In this example, the colored liquid elements 32 may use a transparent saline solution, and the colored liquid elements 32 of different sub-pixels may have a variety of colors, for example, in order to display three colors of RGB, that is, the colors of the colored liquid elements corresponding to three adjacent sub-pixels are R (red), G (green) and B (blue), respectively. The opaque liquid elements for example can use oil ink.

In this embodiment, the dielectric layer 35 may be white, and the opaque liquid elements 34 may be black; alternatively, the dielectric layer 35 may be black, and the opaque liquid elements 34 may be white.

When the dielectric layer 35 is black and the opaque liquid elements 34 are white, for each sub-pixel, the display principle is described below. Taking the color of the changing the voltage applied to the pixel electrode 36, controls the white opaque liquid element 34 to contract, the sub-pixel displays the color of the black dielectric layer 35 under the white opaque liquid element 34, and at this time the displayed color of the sub-pixel is black; when the sub-pixel, by changing the voltage applied to the pixel electrode 36, controls the white opaque liquid element 34 to expand and flat on the dielectric layer 35, the sub-pixel displays the color of the colored liquid element 32, that is, at this time the displayed color of the sub-pixel is R.

When the dielectric layer 35 is white and the opaque liquid elements 34 are black, for each sub-pixel, the display principle is described as below. Taking the color of the colored liquid elements 32 to be R as an example, as shown in FIG. 4, when the sub-pixel, by changing the voltage applied to the pixel electrode 36, controls the black opaque liquid element 34 to contract, the sub-pixel displays the color of the white dielectric layer 35 under the black opaque liquid element 34, and at this time the displayed color of the sub-pixel is the color of the colored liquid element 32, i.e. R; when the sub-pixel, by changing the voltage applied to the pixel electrode 36, controls the black opaque liquid element 34 to expand and flat on the dielectric layer 35, the sub-pixel displays the color of the black opaque liquid element 34, that is, at this time the displayed color of the sub-pixel is black.

When the color of the colored liquid elements is G or B, the color display process of the sub-pixel is similar to the process described above, that is, the sub-pixel, by means of the pixel electrode 36, controls the opaque liquid element 34 to contract, thereby achieving the R, G, B, and black display, respectively. Through the combination of colors of all sub-pixels on the display panel, full-color display for an image is achieved.

Further, in order to prevent the opaque liquid elements 34 of different sub-pixels from being mixed together and causing the problem of an unbalanced color display of the sub-pixels, the composition of the opaque liquid elements 34 may be selected, so that the opaque liquid elements 34 corresponding to adjacent sub-pixels are immiscible inter se. For example, this can be realized in the following ways. For instance, hydrocarbon oils are not miscible inter se; taking HFC-134a and CFC-12 as an example, both are neither miscible inter se nor soluble in water, and thus the opaque liquid elements 34 corresponding to adjacent sub-pixels can use HFC-134a and CFC-12 respectively. By adding different pigments into HFC-134a and CFC-12, different colored opaque liquid can be obtained. Preferably, pigment particles or nanoparticles may be adopted as a colorant.

In the above-described implementation, the black display is achieved with a black dielectric layer 35 or black opaque liquid elements 34; further, the black display may also be achieved with opaque pixel electrodes 36. For instance, the dielectric layer 35 uses a transparent material, the opaque liquid elements 34 use white oil ink, and the opaque pixel electrodes 36 are black; thus, when the sub-pixel, by changing the voltage applied to the pixel electrode 36, controls the white opaque liquid element 34 to contract, the sub-pixel displays the color of the black opaque pixel electrode 36, and at this time the displayed color of the sub-pixel is black; when the sub-pixel, by changing the voltage applied to the pixel electrode 36, controls the white opaque liquid element 34 to expand and flat, at this time the displayed color of the sub-pixel is the color of the colored liquid element 32. Alternatively, the dielectric layer uses a transparent material, the opaque liquid elements 34 use black oil ink, and the opaque pixel electrodes 36 are white; thus, when the sub-pixel, by changing the voltage applied to the pixel electrode 36, controls the black opaque liquid element 34 to contract, the sub-pixel displays the white opaque pixel electrode 36, and at this time the displayed color of the sub-pixel is the color of the colored liquid element 32; when the sub-pixel, by changing the voltage applied to the pixel electrode 36, controls the black opaque liquid element 34 to expand and flat, at this time the displayed color of the sub-pixel is black.

In the electrowetting display panel according to the embodiment of the present invention, there is disposed an opaque insulating layer comprising a dielectric layer and oil ink (opaque liquid elements), the dielectric layer and the oil ink cooperate to implement switching between black and white under an action of an electric field; meanwhile, between the oil ink and the first substrate, there are disposed colored liquid elements in different colors which are used for a plurality of sub-pixels; the individual sub-pixels of the electrowetting display panel can utilize the colored liquid elements to display colors when the opaque insulating layer is presented in white, and display black when the opaque insulating layer is presented in black, thereby achieving color or full-color display. The embodiment of the invention is simple in a manufacturing process, and has no color residue or variegated color in display, and it is easy to be implemented.

The above description is the preferred implementations of the present invention. It should be noted that, for the ordinary skilled in the art, improvements and modifications without departing from the principles described in the present invention can be made to the present invention, also these improvements and modifications should be regarded as within the protection scope of the present invention.

The invention claimed is:

1. An electrowetting display panel, comprising:
   a first substrate,
   a second substrate opposite to the first substrate,
   a plurality of baffle walls disposed on the second substrate and defining a plurality of sub-pixels, wherein the plurality of baffle walls extend from the second substrate to the first substrate,
   an opaque insulating layer disposed on the second substrate, the opaque insulating layer comprising a dielectric layer and opaque liquid elements disposed on the dielectric layer;
   a plurality of colored liquid elements corresponding to the individual sub-pixels respectively and disposed between the opaque insulating layer and the first substrate, the colored liquid elements being an electric-conductive or polar light-transmissive color solution and being independent from the opaque liquid elements; and a plurality of pixel electrodes corresponding to the individual sub-pixels respectively and disposed between the second substrate and the opaque insulating layer, wherein in each sub-pixel, one of the dielectric layer, the opaque liquid element and the pixel electrode is black, and in each sub-pixel, the opaque liquid element is capable of contracting around the baffle wall or expanding on the dielectric layer by controlling a voltage applied to the pixel electrode.

2. The electrowetting display panel according to claim 1, wherein the colors of the colored liquid elements of the plurality of sub-pixels are different from one another.

3. The electrowetting display panel according to claim 1, wherein the plurality of colored liquid elements are a transparent electric-conductive saline solution.

4. The electrowetting display panel according to claim 1, wherein the opaque insulating layer comprises:

a white dielectric layer disposed on the second substrate;
black opaque liquid elements corresponding to the individual sub-pixels respectively and disposed on the white dielectric layer, the colored liquid elements and the black opaque liquid elements in the individual stab-pixels being immiscible.

5. The electrowetting display panel according to claim 4, wherein the black opaque liquid elements of adjacent sub-pixels are immiscible inter se.

6. The electrowetting display panel according to claim 4, wherein the black opaque liquid elements or the white opaque liquid elements are hydrocarbon oils.

7. The electrowetting display panel according to claim 1, wherein the opaque insulating layer comprises:

a black dielectric layer disposed on the second substrate;
white opaque liquid elements corresponding to the individual sub-pixels respectively and disposed on the black dielectric layer, the colored liquid elements and the white opaque liquid elements in the individual sub-pixels being immiscible.

8. The electrowetting display panel according to claim 7, wherein the white opaque liquid elements of adjacent sub-pixels are immiscible inter se.

9. The electrowetting display panel according to claim 7, wherein the black opaque liquid elements or the white opaque liquid elements are hydrocarbon oils.

10. The electrowetting display panel according to claim 1, wherein the pixel electrodes are black and opaque; and the opaque insulating layer comprises:

a transparent dielectric layer disposed on the second substrate;
white opaque liquid elements corresponding to the individual sub-pixels respectively and disposed on the transparent dielectric layer, the colored liquid elements and the white opaque liquid elements in the individual sub-pixels being immiscible.

11. The electrowetting display panel according to claim 10, wherein the black opaque liquid elements or the white opaque liquid elements are hydrocarbon oils.

12. The electrowetting display panel according to claim 1, wherein the pixel electrode are white and opaque, and the opaque insulating layer comprises:

a transparent dielectric layer disposed on the second substrate;
black opaque liquid elements corresponding to the individual sub-pixels respectively and disposed on the transparent dielectric layer, the black opaque liquid elements and the colored liquid elements being immiscible.

13. The electrowetting display panel according to claim 12, wherein the black opaque liquid elements or the white opaque liquid elements are hydrocarbon oils.

* * * * *